Oct. 20, 1959 R. O. GUNDERSON 2,909,673
PUSH-PULL MAGNETIC ELEMENT
Filed Feb. 2, 1955 9 Sheets-Sheet 1

INVENTOR.
Robert O. Gunderson
BY Bailey, Stephens & Huettig
Attys.

Oct. 20, 1959     R. O. GUNDERSON     2,909,673
PUSH-PULL MAGNETIC ELEMENT
Filed Feb. 2, 1955     9 Sheets-Sheet 3

INVENTOR.
Robert O. Gunderson
BY Bailey, Stephens & Huettig
Attys.

Oct. 20, 1959   R. O. GUNDERSON   2,909,673
PUSH-PULL MAGNETIC ELEMENT
Filed Feb. 2, 1955   9 Sheets-Sheet 7

INVENTOR.
Robert O. Gunderson
BY Bailey, Stephens & Huettig
Attys.

Oct. 20, 1959 R. O. GUNDERSON 2,909,673
PUSH-PULL MAGNETIC ELEMENT
Filed Feb. 2, 1955 9 Sheets-Sheet 8

INVENTOR.
Robert O. Gunderson
BY Bailey, Stephens & Huettig
Attys.

United States Patent Office 2,909,673
Patented Oct. 20, 1959

2,909,673

PUSH-PULL MAGNETIC ELEMENT

Robert O. Gunderson, St. Paul, Minn., assignor, by mesne assignments, to Librascope, Incorporated, a corporation of California Application February 2, 1955, Serial No. 485,668

25 Claims. (Cl. 307—88)

This invention relates to magnetic components for binary computing machines.

In Goodell et al., application Serial No. 398,658, filed December 17, 1953, for "Information Processing Machines," (now abandoned) and application Serial Number 531,874, filed September 1, 1955 as a continuation of the abandoned application a magnetic element is disclosed which is particularly adapted for use in binary computing machines constructed on logical principles. This magnetic element is of the so-called transformer type, in which a change of flux in the magnetic core will produce an induced signal pulse in the output winding.

In Goodell application Serial No. 451,484, filed August 23, 1954, for "Series Type Decision Element," a magnetic element is disclosed as a so-called series type, in which a clock pulse is used to produce an output pulse only if there has been no flux change in the magnetic core.

The objects of this invention are to improve upon the magnetic element disclosed in application Serial No. 451,484, and useful in binary computing systems as described in application Serial No. 398,658 (now abandoned) and continuation application Serial Number 531,874. Further objects are to improve upon the discrimination between a 0 and a 1 in a magnetic circuit; to produce a magnetic element which is relatively insensitive to clock voltage variations; to produce a magnetic element which requires less power consumption in a computing circuit; and to produce a magnetic element which has great versatility in forming logical functors, so that a less number of elements is needed in a computing circuit.

In general these objects are accomplished by taking two magnetic cores and placing an input, a clock, and a reset winding on each of the cores, the like windings on the cores being connected in series. The windings are so poled that when one core offers a low impedance to the clock pulse, the other offers a high impedance to the clock pulse. Since the balance established between the relative flux conditions in the two magnetic cores is constant, the push-pull element is much less sensitive to variations in clock amplitude, and this makes possible a high degree of discrimination between a 0 and a 1.

The element thus formed is capable of being used either alone or in combination with other similar elements to produce substantially all the functors needed in a binary computing system. The logical functions that can be derived from the basic element fall into three groups:

(a) A group consisting of functors which provide binary 1's only when no current has energized the magnetic element input windings just prior to the clock pulse. In the logical binary system these functors are called D, E, S, K, C and L. This is designated as the functor 1 class.

(b) A second group consisting of magnetic elements which supply binary 1 outputs only when current has energized their input windings just prior to the clock pulse. This is designated as the functor 0 class. These are the functors R, A, T and H, each of which produces a binary 0 output for a 0 input.

(c) A third group consisting of multiple input magnetic elements. In this group the number of such inputs is theoretically infinite. For example, it is noted that the K functor with three inputs can be differentiated from a K element with six inputs, since the condition, if not the nature, of its logical operation varies thereby.

The means by which the objects of the invention are obtained are described more fully with reference to the accompanying drawings, in which.

In the various figures the windings are poled in the direction indicated by the solid dots.

Figure 1:
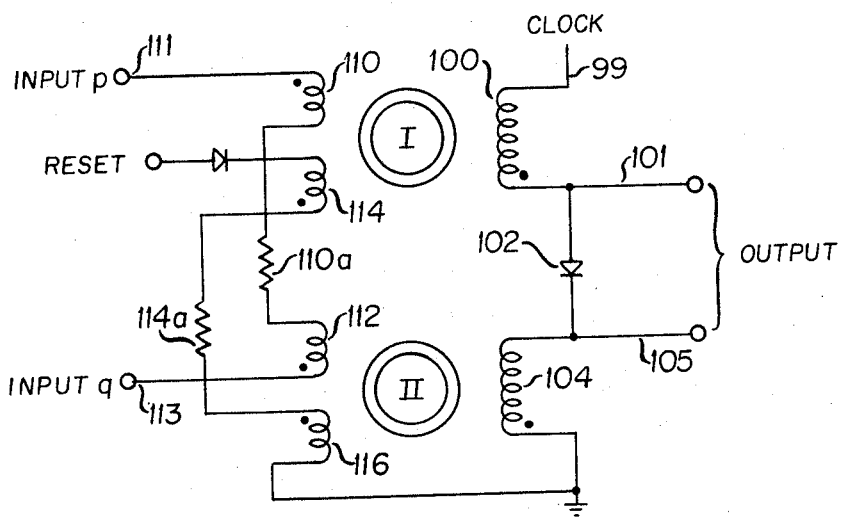
Figure 1 is a circuit diagram of the basic magnetic element in the general functor 1 class.

In Figure 1 two magnetic cores I and II are indicated. A clock 99 is attached to winding 100 on core I, which winding has an output load line 101. Winding 100 is further connected in series through diode 102 and winding 104 to core II and then to ground. Winding 104 has an output load line 105.

On core I an input winding 110 is connected to input terminal 111, and further is connected through series resistance 110a to input winding 112 on core II. Winding 112 is further connected to input terminal 113. The reset winding 114 on core I is connected in series through resistance 114a to reset winding 116 on core II, and then to ground.

The windings are poled as shown to produce a 1 output pulse if there has been no current flow in the input windings. Regardless of any previous core position, the reset pulse in windings 114 and 116 will set core I to a positive position and core II to a negative position. It is noted that the terms positive and negative are used simply to designate a state of magnetization in one direction as compared to magnetization in the opposite direction.

Each of the cores functions as an individual series type element as described in application, Serial No. 451,484. In other words, if a 0 is received at the input terminal for either core, there will be no flux change in the core and the clock pulse in the output winding will not be impeded and will appear as an output pulse. On the other hand, an input 1 will cause a flux change in the core, and the clock pulse in the output winding will be impeded in its effort to effect a reverse flux change, and no output pulse will occur in the output line.

In the circuit shown in Figure 1, if a 0 input occurs in input terminal 111, there is no flux change in either core I or II. When the next clock pulse occurs, winding 100 does not impede it because the winding is poled similarly to reset winding 114, and continues through the winding to appear as an output pulse in line 101, At the same time core II has been placed in negative magnetization by reset winding 116, and, therefore, the clock pulse in winding 104 is highly impeded and substantially no current will flow through it. No output pulse appears in line 105. The net result is that there is an output pulse in line 101.

If an input 1 is received at terminal 111, after a reset pulse, core I is swung to a negative magnetization, while core II is swung into a positive magnetization. The next clock pulse in winding 100 is highly impeded, whereas winding 104 is at low impedance. Consequently, not enough current flows through winding 100 to winding 104 to produce any output signal. No change in the direction of magnetization is made in core II because at this time both core II and winding 104 are poled in the same direction. In this condition, winding 104 is substantially a short circuit across the load which is attached to output lines 101 and 105, and no current is passed to the load. This means that a better discrimination is achieved between output 1 and output 0.

Moreover, as winding 104 is a reacting load, rather than a resistant load, less power is needed to operate the magnetic element than in prior-known elements. As power is delivered from clock to load without inductive coupling, transformer losses are avoided, and because of the increased efficiency the element is a better amplifier. Another advantage lies in the fact that the output pulse, if any, comes from the clock alone and is free from time and voltage disruptions because the reset pulse is used to swing the magnetization in the cores. Thus the output pulse is insensitive to flux changes in the core, and the core does not determine the size of the output pulse.

It is noted that the clock is biased to about −20 volts, and, therefore, the voltage induced in the input windings 110 and 116 by the reset pulse cannot overcome the bias to produce an induced output in windings 100 and 104.

The above described element produces the logical functor S. In a typical element the clock has a voltage of from 12 to 14 volts at 50 kc. Windings 100 and 104 have 300 turns each, windings 110, 112, 114 and 116 have 75 turns each, and resistances 110a and 114a are 470 ohms. The cores A and B are 20-wrap 3/16 mil Mo-Permalloy, and the diodes are Hughes 1 N 126.

Figure 2:
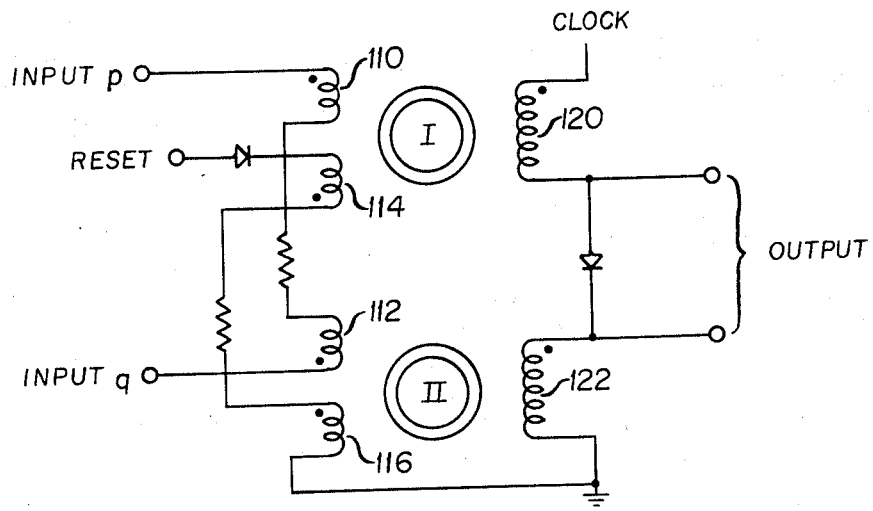
Figure 2 is a circuit diagram of the basic magnetic element in the general functor 0 class.
Figure 3:
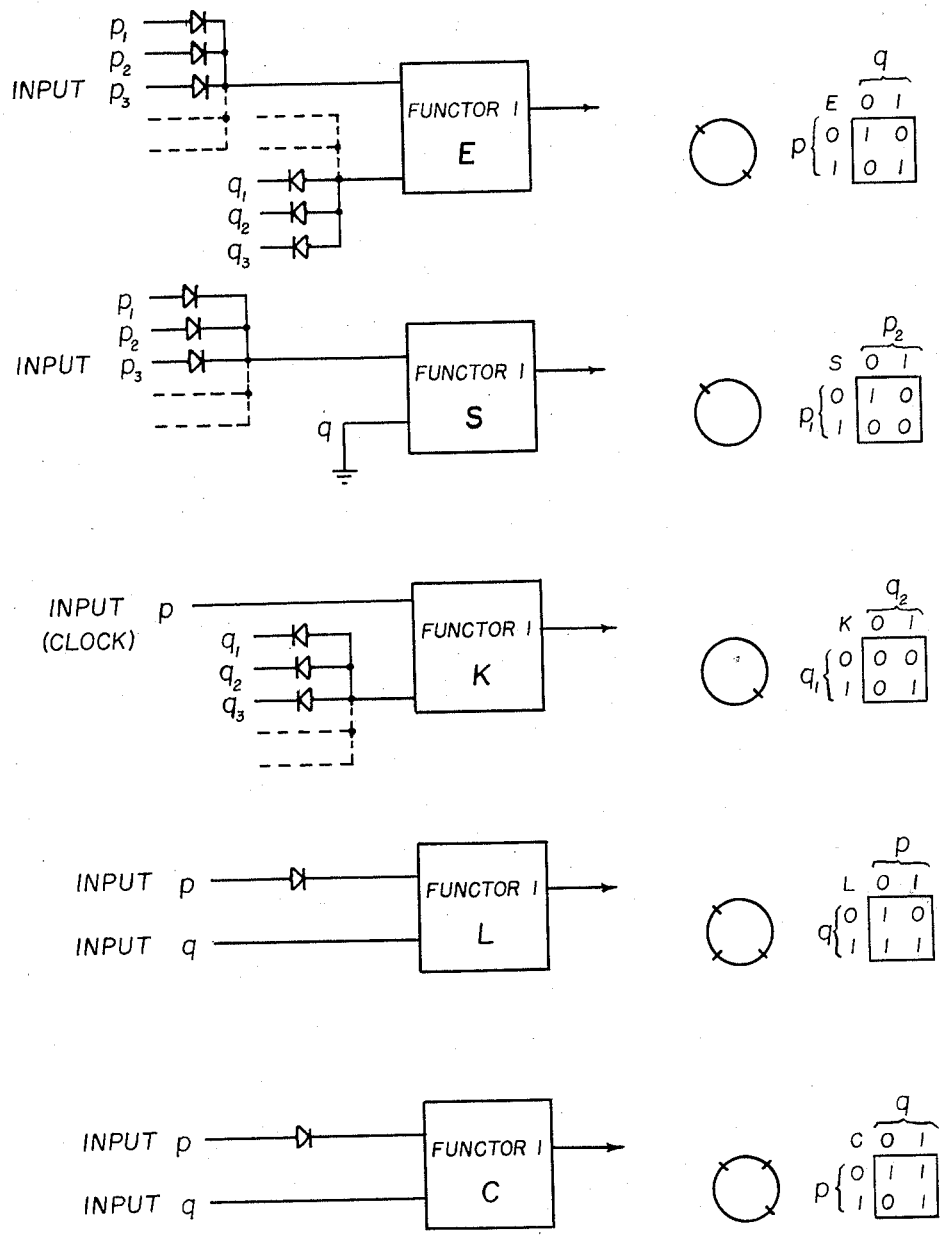
Figure 3 is a symbolic representation of examples of logical functors in the functor 1 class.
Figure 4:
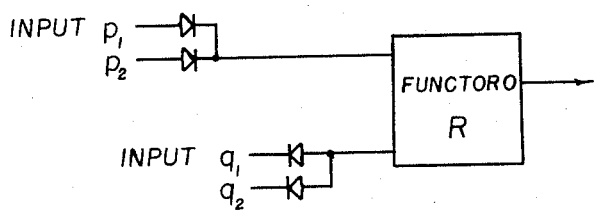
Figure 4 is a symbolic representation of examples of logical functors in the functor 0 class.
Figure 4:
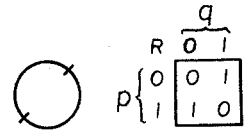
Figure 4:
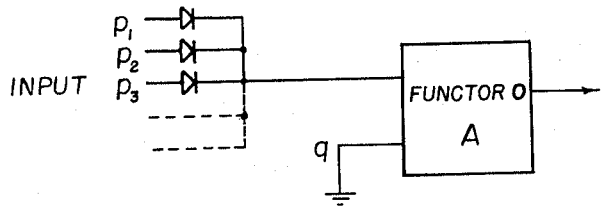
Figure 4:
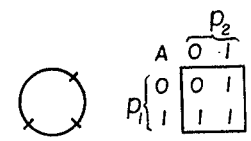
Figure 4:
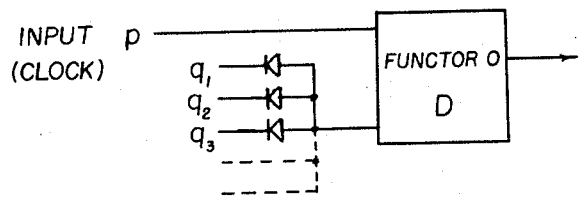
Figure 4:
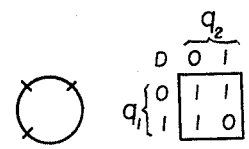
Figure 4:
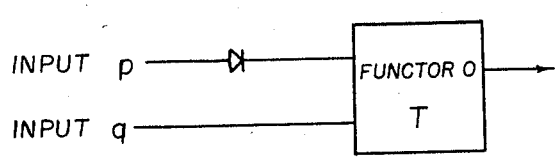
Figure 4:
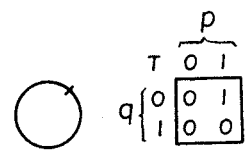
Figure 4:
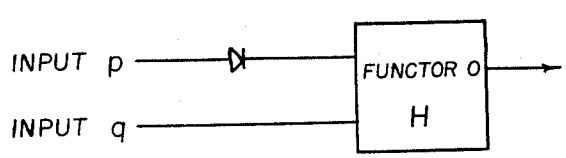
Figure 4:
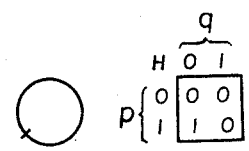

Figure 2 is a magnetic element of the general functor 0 class. The element is poled so as to produce the logical functor A in which an output pulse is produced, a 1 output, only when current has energized an input winding just prior to the clock pulse. It provides a 0 output for a 0 input. In this element the input windings 110, 112 and the reset windings 114 and 116 are similar to those shown in Figure 1. Clock winding 120 is poled opposite to that of winding 100, and winding 122 is similarly oppositely poled to winding 104. If an input 1 is received from winding 110, core I is energized to negative magnetization. The following clock pulse is poled in the same negative direction and, therefore, it is at low impedance and, consequently, an output 1 is made. Core II, which placed in a negative state by the previous reset pulse, is swung to positive by winding 112 which is so poled. As winding 122 is negatively poled, it is at high impedance so that no output pulse occurs. If an input 0 occurs in winding 110, core I will remain positive from the reset pulse, and clock winding 120 would be at a high impedance so that there will be an output 0. The element of Figure 2 is typical of the logical circuits for the functors R, A, D, T and H.

By coupling together basic magnetic elements either of the Figure 1 type or the Figure 2 type, or combinations of the two types, substantially all other logical functors can be derived by making minor modifications, such as changing the polarity of the windings or the directions of the diodes, without affecting the basic principles of operation. As it is impractical to describe all of them in detail, only a few typical examples are given, as follows.

Figure 5:
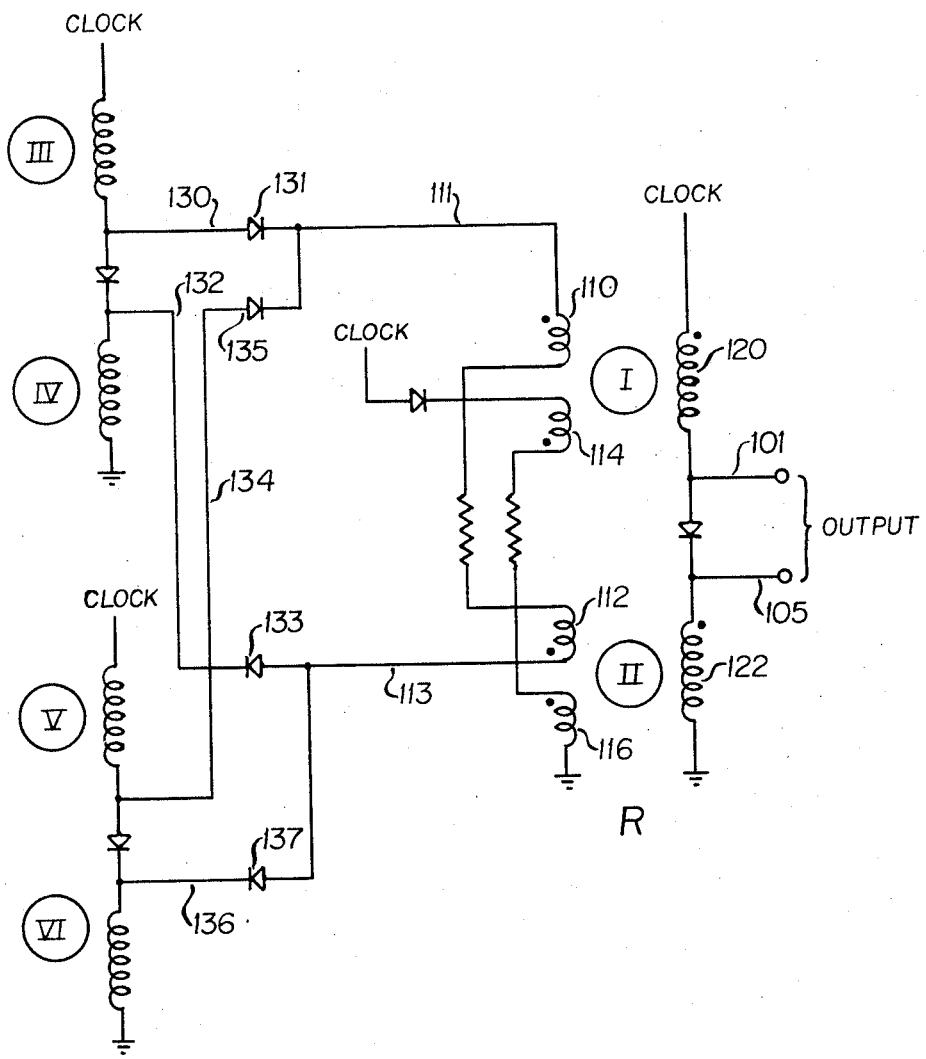
Figure 5 is a circuit diagram of the basic magnetic push-pull elements coupled to produce the functor R.

The R element performs the logical function of "exclusive-or," that is it produces an output 1, if, and only if, its two inputs from one source are dissimilar from two inputs from a second source. The circuit for this element is shown in Figure 5. The basic element containing the cores I and II is similar to that shown in Figure 2 and is termed the driven element. The first driving element is composed of cores III and IV. Core III has its output line 130 connected from core III through positive diode 131 to the input line 111 of the driven element. The output line 132 of core IV is connected through negative diode 133 to input line 113 of core II in the driven element.

The second driving element contains cores V and VI. The output of core V is connected to line 111 by line 134 through positive diode 135, and the output from core VI is connected by output line 136 through negative diode 137 to input line 113.

It is noted that cores III and IV, and cores V and VI, are the cores of basic magnetic elements such as disclosed either in Figure 1 or 2, and that the numerals I, II, etc., are used for descriptive purposes only. Consequently, the driving elements are diagrammatically shown by only indicating the cores and their output windings.

A clock pulse voltage impressed on the output winding of core III may, for example, encounter a low impedance in core III and a high impedance in core IV. If at the same time, a clock pulse in the output winding of core V encounters a high impedance in core V and a low impedance in core VI, the path of the information pulse would be from the clock pulse passing through output winding for core III through lines 130 and 111 into input winding 110 of core I, then through input winding 112 of core II, then through lines 113 and 136 to ground. If, on the other hand, the impedance of core III were high, and the impedance of core IV were low, the path of the clock pulse for core V would be through the output winding for core V through lines 134 and 111 into input windings 110 and 112, then through lines 113 and 132 through the output winding for core IV and to ground. In either of these cases a binary 1 would be transmitted to the driven element and this would saturate cores I and II and induce opposing magnetic states in the two cores such that the output pulse from the clock for cores I and II would encounter a low impedance in core I, and its energy would be transmitted as an output pulse in line 101.

If both information pulses through the output windings of the two driving elements encounter high impedance in cores III and V of the driving element, there would be no difference in potential established, and, therefore, no current would be passed through input windings of cores I and II of the driven element. In this instance the output resulting from the similar information pulses would be a binary 0. The same logical consequence would also characterize a situation in which both information pulses were 0, since there would be then no difference in potential between the information pulse source and ground.

Figure 6:
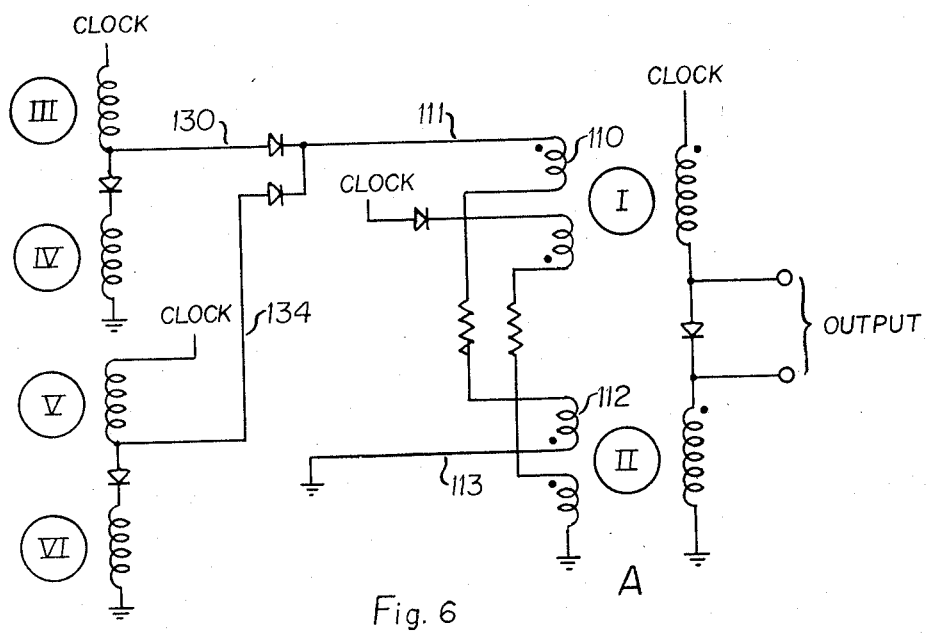
Figure 6 is a like view for the functor A.
Figure 7:
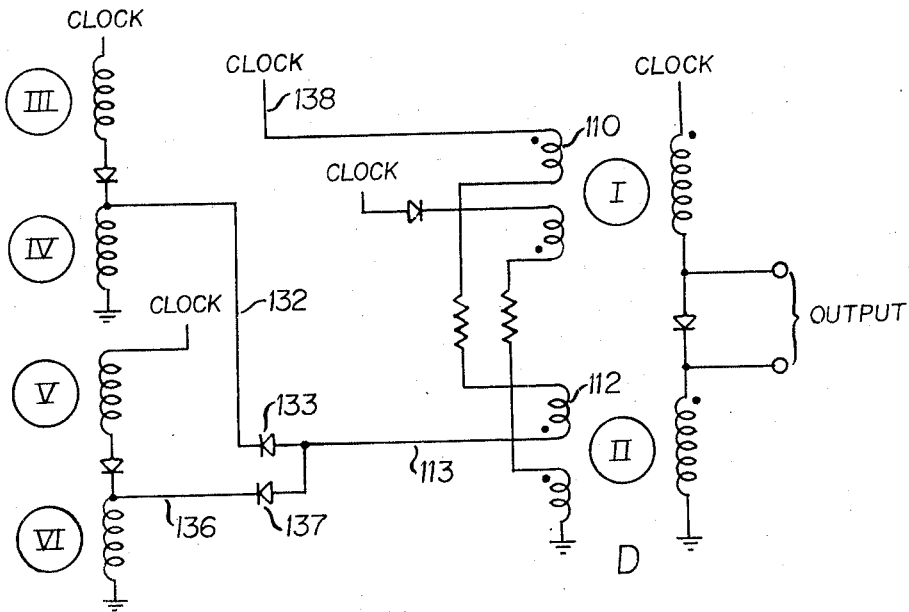
Figure 7 is a like view for the functor D.

The logical functors A and D can be derived from the functor O type basic element as shown in Figures 6 and 7. For the A functor, in Figure 6, the windings on cores I and II are poled in the same manner as shown in Figure 2. Only the output line 130 from core III and 134 from core V are coupled to input line 111 of the basic element. Line 113, extending from input winding 112 on core II, is connected to ground.

Functors A and D are representative in that they too are based on the functor O principle in that a binary 1 clock pulse induces a magnetic flux state in core I so that the current of the clock pulse is transmitted directly to the following load in series with it. Figure 6 shows a particular adaptation of the functor O circuit which makes this logical function possible. Voltages impressed on the output windings of either or both of cores III and V will pass through the input windings on cores I and II of the driven element and then to ground. The logical condition which results from these connections is that a binary 1 produced in the output windings of either cores III or V or both of them, sets up a flux state in core I which enables it to provide a 1 output from the next clock pulse for core I.

The reset pulse function is identical with that of the reset described for the R function, that is it resets the cores so that the cycle may be repeated to perform the A or nonexclusive-or function.

The D function is disclosed in Figure 7. Again the driven element of cores I and II is constructed as shown in Figure 2. Core IV of the driving element is connected by line 132 and negative diode 133 to the line 113 and to input winding 112 on core II. Core VI is connected by line 136 and negative diode 137 to line 113.

The D function is that of disjunction, so that it provides a 1 output if one of the other of its information pulses is 0, or if they are both 0. Considering one of the driving elements alone, for example cores III and IV, if the information output is 0, then the clock voltage on line 138 would pass one line 113 to line 132 through unimpeded core IV to ground. If the information inputs from both driving elements become 0, then there are two unimpeded paths to ground for this clock voltage, namely through unimpeded cores IV and VI.

If the information inputs are both 1, there exists only high impedance paths to ground and consequently insubcient current in the input windings of cores I and II. Therefore, if either or both driving elements have an information output of 0, there will be sufficient current flow in the windings of core I and II to change the flux states.

Figure 8:
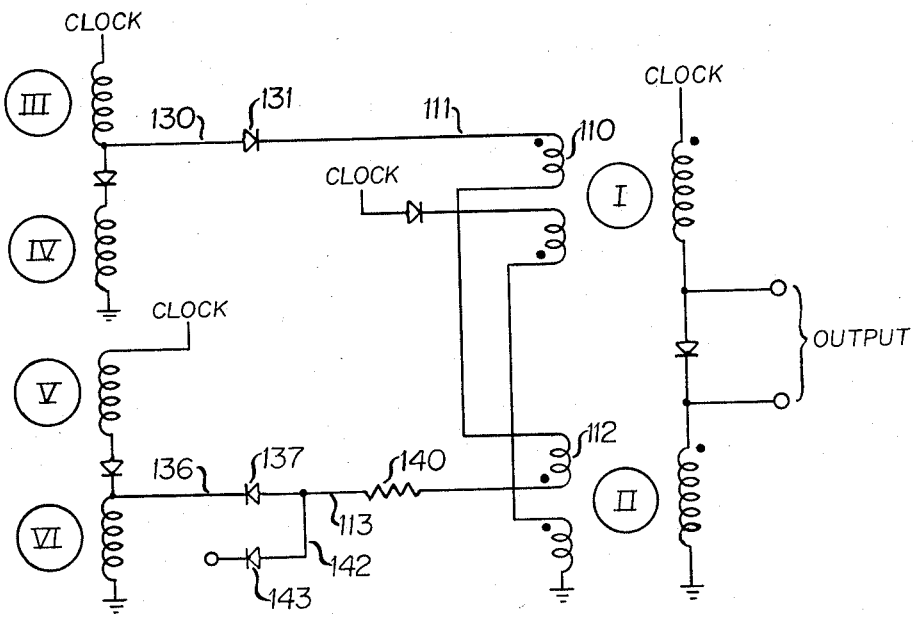
Figure 8 is a similar view for a K inhibited A functor.

The above three examples of the functor 0 type have been given to indicate something of the range and variety of element drives which may be constructed using the basic magnetic element design. As a further example, Figure 8 illustrates a K inhibited A which operates to produce a 1 output for either combination of 1—0 inputs on the lower input line, but is inhibited if both information pulses are 1's. Again the basic driven element containing cores I and II is similar to Figure 2. The output winding of core III is connected by line 130 and positive diode 131 to the input line for winding 110. The output winding for core VI is connected through line 136 and negative diode 137 to the input line 113 for input winding 112, to line having resistance 140. Line 142 contains a negative diode 143, and may be connected to another driving element.

A 1 input on line 142 would produce a high potential which blocks the flow of current in the input windings of the driven element. In this instance a coincidence of 1's in lines 130 and 136 would inhibit the normal operation of the driven element by permitting it to produce a 0.

Figure 9:
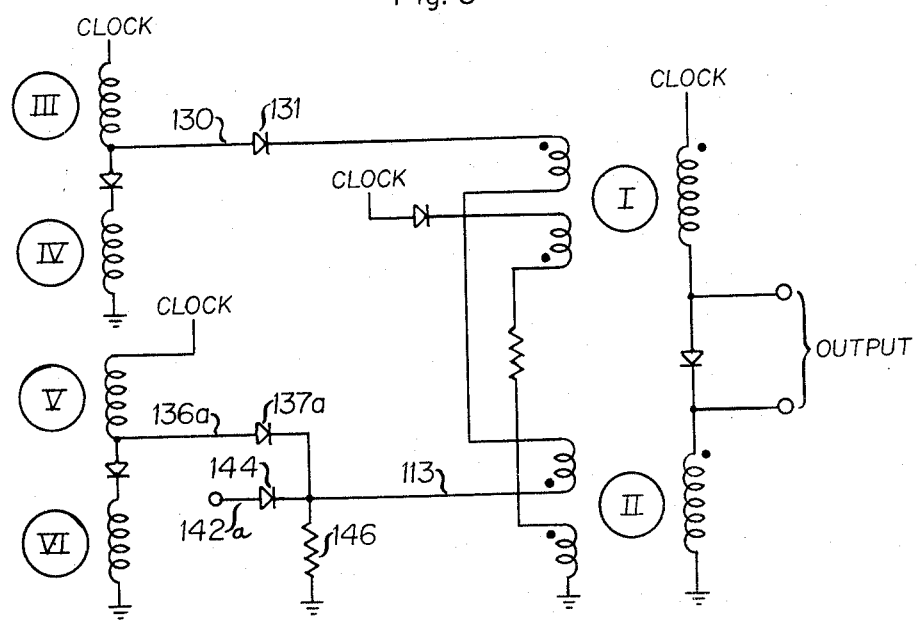
Figure 9 is a similar view of an A inhibited A functor.

In Figure 9 a circuit is shown for another type of function derived from the connections shown in Figure 8. Line 136a connects the output of core V through positive diode 137a to line 113. The line 142a is given a positive diode 144 and connected to line 113 and then through resistance 146 to ground. This circuitry produces an A inhibited A. A voltage impressed on either line 142 or thorugh the output winding of core V passes through resistor 146 to ground. If at the same time a voltage is impressed through line 130, this is blocked by the voltage on line 113, so that no current energizes the input windings of cores I and II. In each of these instances a 1 output from the driving elements is inhibited by a blocking difference in potential which would normally exist as a result of a 1 input, so that a normal output of an A element is negated, or an A driving sequence inhibits an A output.

Figure 10:
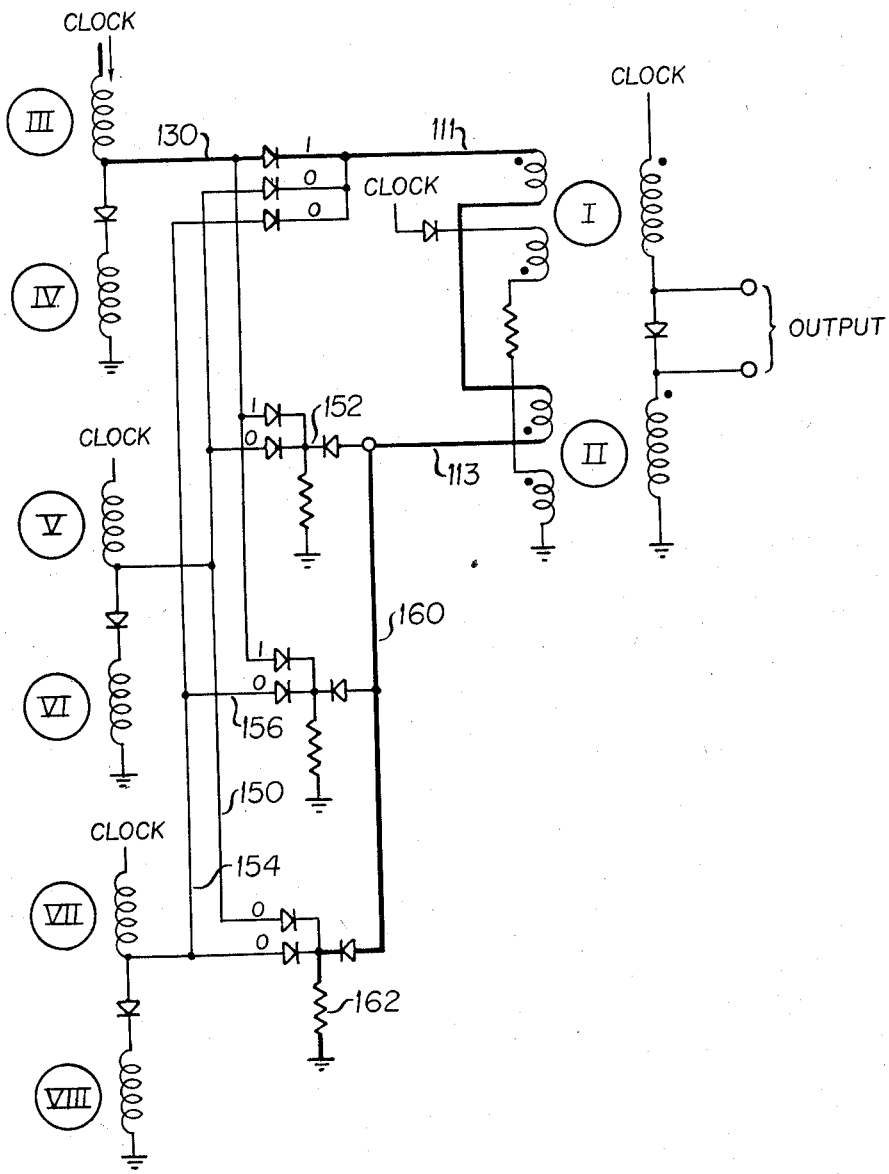
Figure 10 is a like view for a 3 input exclusive-or functor.

In Figure 10 three driving elements are used. The output from core III is connected by line 130 to line 111. The output of core V is connected through line 150 to line 111, and is further connected through line 152 to line 113. The output of core VII is connected to line 111 by line 154 and is further joined by line 156 to line 160 and to line 113. Lines 154 and 160 are connected through resistance 162 to ground.

This circuit consists of a 3 input R, or a 3 input exclusive-or. This is, in one sense, an anomaly, since the exclusive-or function normally applies to two inputs only. In certain instances, however, it is desirable to use a functor which provides a 1 output when one of three information pulses is a 1 and the other two are 0's. In Figure 10, it is shown that any one of the input lines may have a 1 pulse as long as the other two inputs are 0's. In each such condition the driven element will produce a 1. In all other conditions the output of the driven element would be a 0.

All the elements which have been described of the functor 0 class provide a 1 output if the input windings have been energized in the interval immediately preceding the clock pulse. If the sensing of the output windings is inverted, a group of functors may be derived, each of which is the converse of a functor 0 element under the same input conditions.

Some of the elements of the functor 1 class can be derived on the same principle as the functor 0 class by changing the nature of the inputs to the element. Two examples of such are described in Figures 11 and 12.

Figure 11:
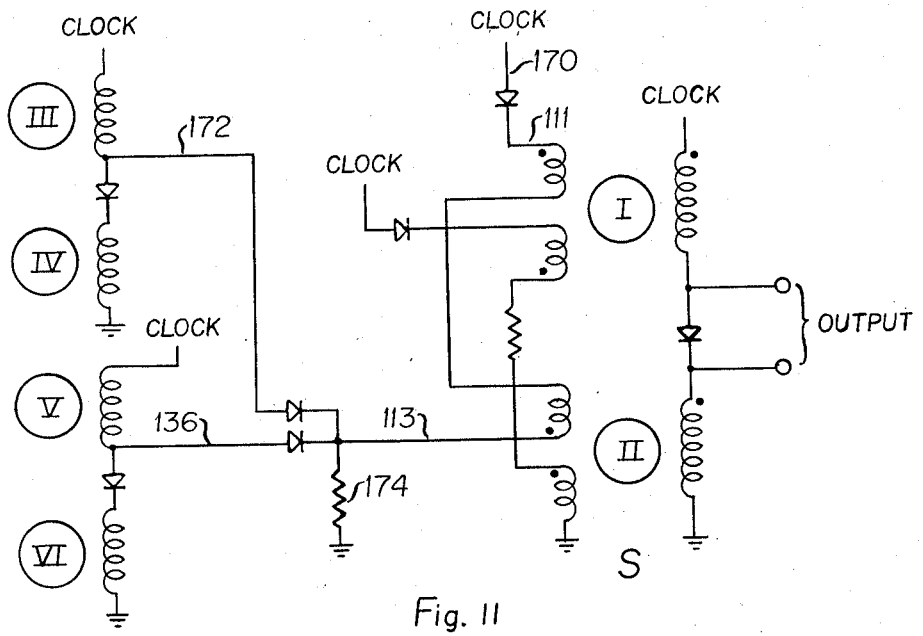
Figure 11 is a like view for the functor S.

In Figure 11 the S functor is shown, which is derived as a part of functor 1 class by utilizing the same inputs as the A element described in Figure 6. Input 111 is connected to a clock line 170. The output line 172 of core III is connected to input line 113. Output line 136 of core V is joined to line 113, and all three lines are connected through resistance 174 to ground. This arrangement of the inputs shows how the S functor can be derived from the functor 0 class. In this circuit, a 1 on either of the inputs from the driving elements prevents the input windings for cores I and II of the driven element from being energized at clock pulse time in line 170, so that only a coincidence of 0's from the driving elements permit a 1 output in response to a clock pulse for the output windings for cores I and II.

Figure 12:
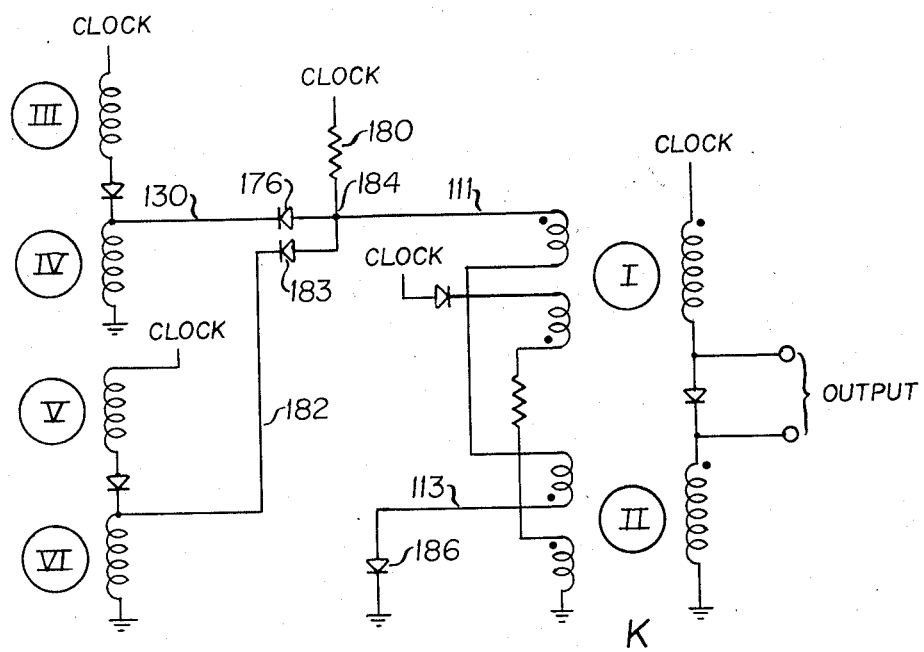
Figure 12 is a like view for the functor K.

Similarly, a K element, which is largely the converse of the D functor illustrated in Figure 7, may be derived on the functor 0 basis by arranging the inputs as shown in Figure 12. The output line 130 from core IV is connected through negative diode 176 to input line 111 of core I, these two lines being connected through resistance 180 to a clock. The output for core VI is connected through line 182 and negative diode 183 to the junction point 184 between lines 111, 130 and resistor line 180. Input line 113 for core I is grounded through positive diode 186.

In this circuit the coincidence of 1's at junction 184 blocks the return to ground of the clock pulse across resistor 180 through lines 130 and 182 to the output winding of one of the driving elements, and instead causes the current to flow through the input windings of the driven element.

The information pulse thus leaves core I of the driven element in a flux state such that its direction corresponds to that of the driven element clock pulse, and thus permits a 1 output for a coincidence of 1 inputs, which is a logical function of the K element. Here, too, the 1 output is a consequence of the input windings being energized so that the K functor can be derived either as a member of the functor 1 or functor 0 class. The function of the resistor 180 in series with the input windings of the driven element is to limit the forward current through the negative diodes 176 and 183 to the output windings on cores IV to VI of the driving elements. In the same way the diode 186 in series with the ground of the input windings prevents the magnetic states of the cores from being changed by back voltage which might be drawn from ground at times other than input times.

Figure 13:
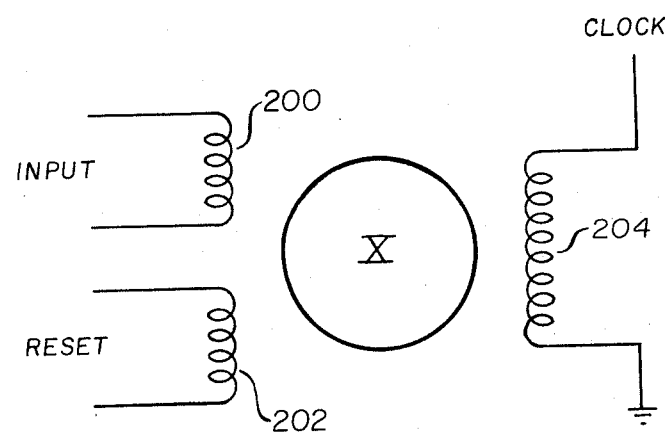
Figure 13 is a modified form of the magnetic element.

In Figure 13 a modified element is shown which is able to operate at higher speeds than the elements shown in Figures 1 and 2. A single magnetic core X is provided with an input winding 200, a reset winding 202, and a clock output winding 204. As described for Figures 1 and 2, the use of the reset winding 202 relieves the clock pulse of energy loss in reversing the magnetic state of the core. The simplicity of construction allows the core to turn over much faster than a double core. The element of Figure 13 could operate at a speed of 250 kc., whereas the cores of Figures 1 and 2 are limited to much slower speeds. Various functors can be made by combining the elements of Figure 13 in ways substantially similar as described for the preceding figures.

Having now described the means by which the objects of the invention are obtained,

I claim:

1. A push-pull magnetic element comprising a pair of magnetic cores, a pair of input windings on said cores connected in series and poled in opposite directions, a pair of reset windings on said cores connected in series and poled in opposite directions with respect to each other, and also opposite on each core to the input windings, and a pair of clock output windings on said cores connected in series and poled in the same direction with respect to each other, and poled in a direction with respect to the poled direction of the input windings dependent upon the logical functor output signal specified for said element.

2. A push-pull magnetic element as in claim 1, further comprising said output windings being poled in the same direction.

3. A magnetic circuit comprising two push-pull magnetic elements each having two output lines and constituting driving elements; a push-pull driven element having input, clock-output, and reset windings series connected, respectively, on two magnetic cores; and means separately connecting the input winding for each core of the driven element to the output lines of two different driving cores for producing a 1 output from the driven element if, and only if, the two inputs to one core of the driven element are dissimilar to the two inputs to the other core.

4. A magnetic circuit comprising two push-pull magnetic elements each having two output lines and constituting driving elements; a push-pull driven element having input, clock-output, and reset windings series connected, respectively, on two magnetic cores; and means connecting the input winding for one core to the output lines for both the driving elements for producing an output 1 from the driven element upon receiving an input 1 from a driving element.

5. A magnetic circuit comprising two push-pull magnetic elements each having two output lines and constituting driving elements; a push-pull driven element having input, clock-output, and reset windings series connected, respectively, on two magnetic cores; and means connecting the input winding for one core to the output lines for both the driving elements for producing an output 1 from the driven element upon receiving an input 0 from a driving element.

6. In combination, a first magnetic member saturable with fluxes of opposite polarities, a second magnetic member saturable with fluxes of opposite polarities, first, second and third windings magnetically coupled to the first magnetic member, fourth, fifth and sixth windings magnetically coupled to the second magnetic member, means including first unidirectional means connected in a circuit with the first and fourth windings for applying reset pulses of a particular polarity to the windings to saturate the first and second members with fluxes of a particular polarity, means including the second and fifth windings for applying input pulses to the windings after the application of the reset pulses to produce fluxes in the magnetic members of a polarity opposite to the polarity of the fluxes produced by the reset pulses, means for providing clock signals, and means including the third and sixth windings and second unidirectional means connected in a circuit to ground with the clock means for applying clock signals to the third windings and for producing output pulses from the third winding upon the prior production by the input pulses of a low impedance to the clock pulses in the third winding and a high impedance to the clock pulses in the sixth winding with respect to ground.

7. In combination, a first magnetic member including a first core saturable with fluxes of opposite polarities and including first, second and third current conductors magnetically coupled to the core, a second magnetic member including a second core saturable with fluxes of opposite polarities and including first, second and third current conductors magnetically coupled to the core, means including the first conductors for initially producing a saturation of the first core with flux of a first polarity and a saturation of the second core with flux of a second polarity opposite to the first polarity, means including the second conductors for providing a saturation of the first core with flux of the second polarity and for saturating the second core with flux of the first polarity upon the introduction of input pulses to the conductors after the initial saturation of the cores, and means including the third conductors and unidirectional means for producing a saturation of the first and second cores with fluxes of the same polarity upon the introduction of clock signals to the conductors after the introduction of the input pulses to obtain output pulses in accordance with the prior saturations of the first and second cores by the introduction or lack of introduction of the input pulses to the second conductors.

8. In combination, a first magnetic member saturable with fluxes of first and second polarities, first, second and third windings magnetically coupled to the first member, a second magnetic member saturable with fluxes of first and second polarities, fourth, fifth and sixth windings magnetically coupled to the second member, the first and fourth windings being connected to produce fluxes of opposite polarities in their associated members, the second and fifth windings being connected to produce fluxes of opposite polarities in their associated members, the third and sixth windings being connected to produce fluxes of the same polarity in their associated members, means for initially introducing reset pulses to the first and fourth windings for a saturation of the first and second magnetic members with fluxes of opposite polarities, means for introducing input pulses to the second and fifth windings after the introduction of the reset pulses and of a polarity opposite to the reset pulses for a saturation of the first and second magnetic members with fluxes of polarities opposite to the fluxes produced by the reset pulses, and means for introducing clock signals to the third and sixth windings after the introduction of the reset and input pulses to produce output pulses from the third winding in accordance with the impedance presented by the third and sixth windings as a result of the prior introduction or prior lack of introduction of input pulses to the second and fifth windings.

9. In combination, first and second members each saturable with fluxes of opposite polarities upon the application of volt-seconds to the member, a first pair of windings each magnetically coupled to a different one of the members to produce flux in its associated member upon the passage of a current through the winding, a second pair of windings each magnetically coupled to a different one of the members to produce flux in its associated member upon the passage of a current through the winding, a third pair of windings each magnetically coupled to a different one of the members to produce a flux in its associated member, means including first unidirectional means connected in a circuit with the windings in the first pair for obtaining at intervals the flow of a current of saturating characteristics through the windings and of a first flux polarity through the winding magnetically coupled to the first member and of a second flux polarity and of saturating characteristics through the winding magnetically coupled to the second member, means connected in a circuit with the windings in the second pair for obtaining the flow of current through the windings after the flow of current through the first windings and for obtaining a flow of current of the second flux polarity and of saturating characteristics through the winding in the second pair magnetically coupled to the first member and of the first flux polarity and of saturating characteristics through the winding in the second pair magnetically coupled to the second member, and means including second unidirectional means connected in a circuit with the windings in the third pair for obtaining a flow of current through the windings after the flow of current through the second windings and for obtaining a flow of current of the second flux polarity and of saturating characteristics through both windings in the third pair to obtain an output signal in accordance with the prior saturations of the magnetic members and upon the presentation of a low impedance by a particular one of the magnetic members and a high impedance by the other magnetic member.

10. In combination, first and second members each saturable with fluxes of first and second pluralities, first, second and third windings disposed on each member, a plurality of unidirectional means, means connected in a circuit with first unidirectional means in the plurality and the first winding on the first member for introducing at intervals first signals to the winding to saturate the first member with flux of the first polarity and connected in the circuit with the first winding on the second member for introducing the first signals to the winding to saturate the second member with flux of the second polarity, means connected in a circuit with the second winding on the first member for introducing at intervals second signals to the winding, after the introduction of the first signals, to saturate the first member with flux of the second polarity and connected in the circuit with the second winding on the second member for introducing the second signals to the winding to saturate the member with flux of the first polarity, and means connected in a series circuit with second unidirectional means in the plurality and the third windings on the first and second members for introducing at intervals third signals to the windings after the introduction of the first and second signals to saturate the members with fluxes of the first polarity and to produce output signals only in accordance with the prior introduction or lack of introduction of the second signals as represented by a low impedance in a particular one of the magnetic members and a high impedance at the same time in the other magnetic member.

11. In combination, first and second members each saturable with fluxes of opposite polarities, first windings each magnetically coupled to a different one of the members to obtain the production of flux in the member, second windings each magnetically coupled to a different one of the members to obtain the production of flux in the member, third windings each magnetically coupled to a different one of the members to obtain the production of flux in the member, first unidirectional means, means connected in a series circuit with the first windings and the first unidirectional means to apply at intervals signals to the windings for the production of flux of only a first polarity in the first member and of only a second polarity in the second member and of a sufficient magnitude to saturate the members with fluxes of the proper polarities, means connected in a series circuit with the second windings to apply signals to the windings for the production of flux of only the second polarity in the first member and of only the first polarity in the second member and of a sufficient magnitude to saturate the members with fluxes of the proper polarities and for applying the signals to the second windings after the application of the signals to the first windings, second unidirectional means, means including the second unidirectional means connected in a series circuit with the third windings to apply signals to the windings for the production of flux of only the first polarity in the first and second members and of a sufficient magnitude to saturate the members to produce an output pulse dependent upon the prior saturation of the members and only upon the production of a low impedance by the first magnetic member in the third winding coupled to the magnetic member and the simultaneous production of a high impedance by the second magnetic member in the third winding magnetically coupled to the member and for applying the signals to the third windings after the application of the signals to the second windings.

12. In combination, a first magnetic member saturable with fluxes of opposite polarities, a second magnetic member saturable with fluxes of opposite polarities, first, second and third windings magnetically coupled to the first magnetic member, fourth, fifth and sixth windings magnetically coupled to the second magnetic member, each of the first and second magnetic members having characteristics for producing a low impedance in the windings upon the saturation of the member with flux of one polarity and the introduction of signals to the windings in a direction for producing increased flux of that polarity and for producing a high impedance upon the saturation of the member with flux of one polarity and the introduction of signals to the windings in a direction for producing flux of an opposite polarity, means including first unidirectional means connected in a circuit with the first and fourth windings for periodically applying voltage pulses to the windings to produce saturating fluxes of the first polarity in the first and second members, means connected in a circuit with the second and fifth windings for applying input pulses to the windings after the reset pulses to produce saturating fluxes of the second polarity in the first and second members, one of the terminals of the sixth winding being connected to ground and an output line being connected to the ungrounded terminal of the sixth winding to produce output signals only upon the occurrence of a high impedance in the sixth winding, and means including second unidirectional means connected in a circuit to ground with the third and sixth windings for introducing clock signals to the third and sixth windings to produce output signals in the output line only upon the occurrence of a high impedance in the sixth winding and the simultaneous occurrence of a low impedance in the third winding in accordance with the prior introduction of input signals to the second and fifth windings.

13. In combination, a first magnetic member saturable with fluxes of opposite polarities, a second magnetic member saturable with fluxes of opposite polarities, each of the first and second magnetic members having characteristics for producing a low impedance upon the saturation of the member with flux of one polarity and the introduction of signals in a direction for producing increased flux of that polarity and for producing a high impedance upon the saturation of the member with flux of one polarity and the introduction of signals in a direction for producing flux of an opposite polarity, first, second and third windings magnetically coupled to the first magnetic member, fourth, fifth and sixth windings magnetically coupled to the second magnetic member, means including first unidirectional means connected in a series circuit with the first and fourth windings for periodically applying voltage pulses to the windings to produce saturating fluxes of the first polarity in the first and second members, means connected in a circuit with the second and fifth windings for applying input pulses to the windings after the reset pulses to produce saturating fluxes of the second polarity in the first and second members, means including second unidirectional means connected in a series circuit to ground with the third and sixth windings for applying clock pulses periodically to the windings after the reset and input pulses to produce fluxes of opposite polarities in the first and second magnetic members, and an output line connected to the sixth winding to receive output pulses upon the application of the clock pulses to the third and sixth windings, the sixth winding being connected to provide for the production of output pulses on the output line upon the introduction of clock pulses and upon the presentation of a high impedance to the sixth winding by the second magnetic member and the simultaneous presentation of a low impedance to the third winding by the first magnetic member in accordance with the prior introduction or lack of introduction of input pulses to the second and fifth windings.

14. In the combination set forth in claim 13, third and fourth magnetic members saturable with fluxes of opposite polarities, means for coupling the third and fourth magnetic members in a manner similar to the first and second magnetic members to produce output pulses at particular times in accordance with the coupling between the members, and means for introducing the output pulses from the third and fourth magnetic members to the second and fifth windings to control the production of output pulses on the output line.

15. In the combination set forth in claim 14, third and fourth magnetic members each saturable with fluxes of opposite polarity, the third and fourth magnetic members being coupled to each other and to the first and second magnetic members in a particular relationship to introduce signals to the third and sixth windings only upon the introduction of signals to the third and fourth magnetic members in a particular relationship dependent upon the coupling between the various magnetic members.

16. The combination as set forth in claim 10 in which third and fourth saturable members are included and in which windings corresponding to the windings on the first and second members are disposed on the third and fourth members and are connected to each other in a relationship corresponding to the relationship recited for the windings on the first and second saturable member and in which the windings on the third and fourth saturable members are connected in circuits with third and fourth unidirectional means in the plurality and with the second windings on the first and second members to control the introduction of the second signals to the second windings on the first and second members in accordance with the pattern of occurrence of output pulses from the third windings on the third and fourth saturable members.

17. In a combination as set forth in claim 8, third and fourth magnetic members each saturable with fluxes of opposite polarities upon the application of signals to the member, fifth and sixth magnetic members each saturable with fluxes of opposite polarities upon the application of signals to the member, a plurality of output windings each magnetically coupled to a different one of the third, fourth, fifth and sixth magnetic members, the output windings magnetically coupled to the third and fourth magnetic members and magnetically coupled to the fifth and sixth magnetic members being connected in a relationship corresponding to that recited for the third and sixth windings magnetically coupled to the first and second magnetic members, the third and fourth magnetic members being paired in a relationship corresponding to that recited for the first and second magnetic members to produce initial saturations of the members in opposite polarities, the fifth and sixth magnetic members being paired to produce initial saturations of the members in opposite polarities, and electrical circuitry including the output windings magnetically coupled to the third, fourth, fifth and sixth magnetic members and including the second and fifth windings magnetically coupled respectively to the first and second members and including unidirectional means connected in a particular relationship for receiving input pulses and for introducing input pulses to the second and fifth windings only upon the prior saturation of the third and fourth members in a particular pattern relative to the prior saturation of the fifth and sixth members.

18. Apparatus as set forth in claim 7, including, first driving means connected to provide high or low impedances in accordance with the prior introduction or lack of introduction of input pulses to the driving means, second driving means connected to provide high or low impedances in accordance with the prior introduction or lack of introduction of input pulses to the driving means, and means including the first and second driving means and unidirectional means connected in a circuit in a logical relationship with the second conductors to provide for the introduction of input pulses to the conductors in accordance with the pattern of occurrence of the high and low impedances in the driving means.

19. Apparatus as set forth in claim 9, including, first driving means connected to provide a high or low impedance in accordance with the prior introduction of input signals to the driving means, and second driving means connected to provide a high or low impedance in accordance with the prior introduction of input signals to the driving means, the first and second driving means being connected in a circuit with the second windings to control the introduction of input pulses to the windings in accordance with the pattern of the low and high impedances in the driving means.

20. Apparatus as set forth in claim 9, including, first driving means having characteristics for providing high or low impedances in accordance with the introduction or lack of introduction of input signals to the driving means, second driving means having characteristics for providing high or low impedances in accordance with the introduction or lack of introduction of input signals to the driving means, and means including the first driving means and including third unidirectional means connected in a first branch to the windings in the second pair and including the second driving means and fourth unidirectional means connected in a second branch to the windings in the second pair to provide for an introduction of input pulses to the windings in accordance with the occurrence or lack of occurrence of high impedances in the first and second driving means and in accordance with the connections of the third and fourth unidirectional means to the first and second driving means and to the windings in the second pair.

21. Apparatus as set forth in claim 9, including, first driving means having input and output lines and having characteristics for providing a low or high impedance in accordance with the prior introduction or lack of introduction of an input pulse to the driving means, second driving means having input and output lines and having characteristics for providing a low or high impedance in accordance with the prior introduction or lack of introduction of an input pulse to the driving means, third unidirectional means connected in a first branch with the first driving means and the windings in the second pair at the input line to the driving means to impede the flow of current through the windings and the first driving means upon the occurrence of a high impedance in the first driving means, and fourth unidirectional means connected in a second branch with the second driving means and the windings in the second pair at the input line to the driving means to impede the flow of current through the windings and the second driving means upon the occurrence of a high impedance in the second driving means, the third and fourth unidirectional means being connected to each other in an "or" relationship to control the flow of current through the windings in the second pair in accordance with the pattern of occurrence of the impedances in the first and second driving means.

22. Apparatus as set forth in claim 9, including, first driving means having input and output lines and having characteristics for providing a low or high impedance in accordance with the prior introduction or lack of introduction of an input pulse to the driving means, second driving means having input and output lines and having characteristics for providing a low or high impedance in accordance with the prior introduction or lack of introduction of an input pulse to the driving means, third unidirectional means connected in a first branch with the first driving means and the windings in the second pair at the output line of the first driving means to obtain a flow of current through the windings and the first driving means upon the occurrence of a high impedance in the first driving means, and fourth unidirectional means connected in a second branch with the second driving means and the windings in the second pair at the output line of the second driving means to obtain a flow of current through the windings and the second driving means upon the occurrence of a high impedance in the second driving means, the third and fourth unidirectional means being connected to each other in an "or" relationship.

23. Apparatus as set forth in claim 7, including, first driving means having input and output lines and connected to provide high or low impedances in accordance with the prior introduction or lack of introduction of input pulses to the driving means, second driving means having input and output lines and connected to provide high or low impedances in accordance with the prior introduction or lack of introduction of input pulses to the driving means, first unidirectional means connected in a first branch with the first driving means and the second conductors at the input line to the second driving means to prevent the introduction of input pulses to the conductors upon the occurrence of a high impedance in the first driving means, second unidirectional means connected in a second branch with the second driving means and the second conductors at the input line to the second driving means to prevent the introduction of input pulses to the conductors upon the occurrence of a high impedance in the second driving means, and impedance means, the first and second driving means being connected in a logical "or" relationship with the impedance means to prevent the passage of the input pulses through the second conductors upon the occurrence of a high impedance in either the first or second driving means.

24. Apparatus as set forth in claim 21 in which the third and fourth unidirectional means are connected in a logical "or" relationship to obtain the flow of current through the windings in the second pair upon the occurrence of a low impedance in at least one of the first and second driving means.

25. Apparatus as set forth in claim 7, including, first driving means having input and output lines and having characteristics for providing a low or high impedance in accordance with the prior introduction or lack of introduction of an input pulse to the driving means, second driving means having input and output lines and having characteristics for providing a low or high impedance in accordance with the prior introduction or lack of introduction of an input pulse to the driving means, first unidirectional means connected in a first branch with the first driving means and the windings in the first pair at the output lines of the driving means to provide a controlled introduction of an input pulse to the windings in accordance with the impedance in the first driving means, second unidirectional means connected in a second branch with the second driving means and the windings in the second pair at the output line of the second driving means to provide a controlled introduction of an input pulse to the windings in accordance with the impedance in the second driving means, the first and second unidirectional means being connected in the first and second branches and to each other in an "or" relationship to prevent the introduction of input pulses to the windings upon the occurrence of a low impedance in at least one of the driving means.

References Cited in the file of this patent

UNITED STATES PATENTS

| | | |
|---|---|---|
| 2,719,773 | Karnaugh | Oct. 4, 1955 |
| 2,731,203 | Miles | Jan. 16, 1956 |
| 2,734,185 | Warren | Feb. 7, 1956 |
| 2,802,202 | Lanning | Aug. 6, 1957 |